United States Patent
Natsui et al.

(10) Patent No.: US 9,390,743 B2
(45) Date of Patent: Jul. 12, 2016

(54) TAPE RECORDING MEDIUM, INFORMATION RECORDING/REPRODUCING DEVICE, AND METHOD OF MANUFACTURING TAPE RECORDING MEDIUM

(71) Applicant: PANASONIC INTELLECTUAL PROPERTY MANAGEMENT CO., LTD., Osaka (JP)

(72) Inventors: Akinaga Natsui, Osaka (JP); Takeshi Morita, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/639,075

(22) Filed: Mar. 4, 2015

(65) Prior Publication Data

US 2015/0255107 A1    Sep. 10, 2015

(30) Foreign Application Priority Data

Mar. 5, 2014    (JP) .................................. 2014-042326
Nov. 20, 2014   (JP) .................................. 2014-235642

(51) Int. Cl.
| | | |
|---|---|---|
| G11B 7/09 | (2006.01) | |
| G11B 7/24073 | (2013.01) | |
| G11B 7/24009 | (2013.01) | |
| G11B 7/26 | (2006.01) | |
| G11B 7/24 | (2013.01) | |
| G11B 7/007 | (2006.01) | |
| G11B 20/12 | (2006.01) | |

(52) U.S. Cl.
CPC .......... *G11B 7/24073* (2013.01); *G11B 7/0901* (2013.01); *G11B 7/24009* (2013.01); *G11B 7/007* (2013.01); *G11B 7/0938* (2013.01); *G11B 7/26* (2013.01); *G11B 20/1201* (2013.01); *G11B 2007/240017* (2013.01); *G11B 2220/90* (2013.01)

(58) Field of Classification Search
None
See application file for complete search history.

(56) References Cited

U.S. PATENT DOCUMENTS

| | | | |
|---|---|---|---|
| 6,810,002 B1 | 10/2004 | Sano et al. | |
| 2003/0193845 A1 | 10/2003 | Sano et al. | |
| 2007/0104037 A1* | 5/2007 | Monen et al. | .............. 369/13.37 |

FOREIGN PATENT DOCUMENTS

| | | |
|---|---|---|
| JP | 2000-268370 A | 9/2000 |
| JP | 2006-165845 A | 6/2006 |

* cited by examiner

*Primary Examiner* — Brian Butcher
(74) *Attorney, Agent, or Firm* — McDermott Will & Emery LLP

(57) ABSTRACT

Provided is an optically recordable or reproducible tape recording medium including tracking pattern groups and non-tracking pattern areas. The tracking pattern groups are repeatedly provided along a longitudinal direction of the tape, and each of the groups includes a plurality of tracking patterns. The non-tracking pattern areas are respectively provided between the tracking patterns. In addition, the non-tracking pattern areas have different lengths along the longitudinal direction of the tape.

5 Claims, 4 Drawing Sheets

TAPE RECORDING MEDIUM, INFORMATION RECORDING/REPRODUCING DEVICE, AND METHOD OF MANUFACTURING TAPE RECORDING MEDIUM

RELATED APPLICATIONS

This application claims the benefit of Japanese Application No. 2014-042326, filed on Mar. 5, 2014 and Japanese Application No. 2014-235642, filed on Nov. 20, 2014, the disclosures of which Applications are incorporated by reference herein.

BACKGROUND

1. Field

The present disclosure relates to a tape recording medium applied as a streaming tape for backup of data in a server or the like.

2. Description of the Related Art

In recent years, an amount of data that can be handled has explosively increased as computers and the Internet are developed more and more. Therefore, there is a demand for an increased capacity of recording media used for backup, and a tape recording medium having information recorded or reproduced by irradiation of laser light to an optical phase-change film that is disposed over the tape medium is gaining attention as one example of high-capacity recording media that respond to such a demand.

Conventionally, for high-density optical recording, a tracking pattern is previously transferred and provided on a tape film. A roll-shaped embossing mold is used for transferring a tracking pattern. Specifically, a tracking pattern is transferred to a tape film using a roll-shaped embossing mold provided by causing an address signal or the like unique to a track to be embedded in the tracking pattern, by making copies of the tracking pattern, and by connecting the copies of the pattern (e.g., Unexamined Japanese Patent Publication No. 2000-268370).

SUMMARY

A tape recording medium according to an exemplary embodiment of the present disclosure is optically recordable or reproducible, and includes tracking pattern groups and non-tracking pattern areas. The tracking pattern groups are repeatedly provided along a longitudinal direction of the tape, and each of the groups includes a plurality of tracking patterns. The non-tracking pattern areas are respectively provided between the tracking patterns. Further, the non-tracking pattern areas have different lengths along the longitudinal direction of the tape.

DETAILED DESCRIPTION

Figure 1:
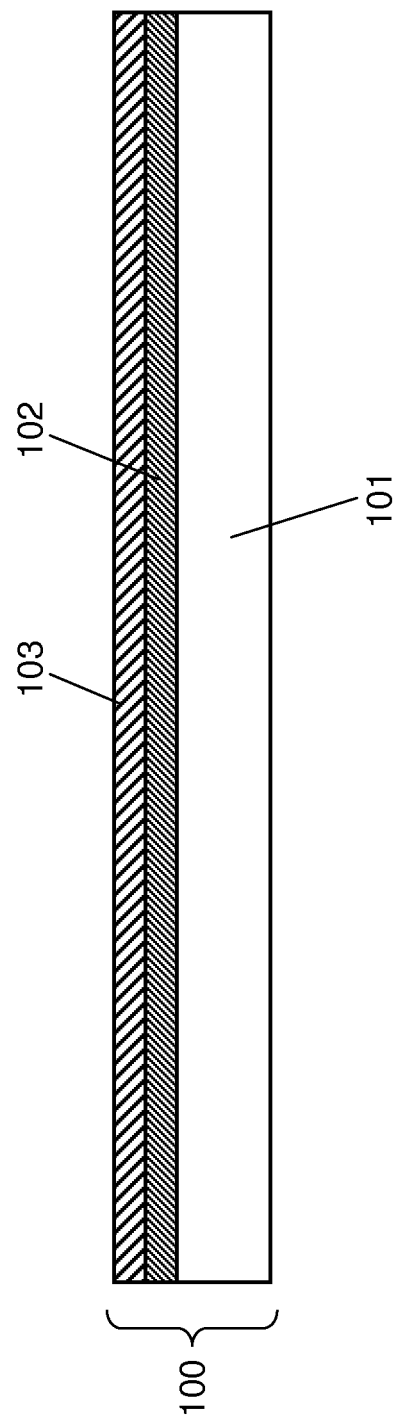
FIG. 1 is a cross-sectional view illustrating a tape recording medium according to one exemplary embodiment.

Hereinafter, exemplary embodiments will be described in detail with reference to the drawing as needed. However, an overly detailed description may be omitted. This, for example, includes detailed descriptions of well-known mattes and redundant descriptions of components that are substantially the same. The omission is made in order to prevent the following description from being too lengthy beyond necessity, and to facilitate understanding of the person skilled in the art.

The accompanied drawings and the following description are provided so that the person skilled in the art may fully understand the present disclosure, and are not intended to limit the subject matters defined in the scope of the claims.

First Exemplary Embodiment

Hereinafter, one exemplary embodiment according to the present disclosure will be described with reference to FIG. 1 through FIG. 4.

1-1. Tape Recording Medium

FIG. 1 is a cross-sectional view illustrating tape recording medium 100 according to this exemplary embodiment. Tape recording medium 100 (one example of tape recording media) includes base film 101, servo-imprinted layer 102, and recording layer 103.

Base film 101 is a polyethylene terephthalate film having thickness about 6 µm, for example.

Servo-imprinted layer 102 is a resin layer disposed over base film 101, and has a tracking pattern. In this exemplary embodiment, the tracking pattern is provided in the following manner. An acrylic-resin based ultraviolet curable resin is applied over base film 101, so that thickness of the applied resin becomes about 0.5 µm. The applied ultraviolet curable resin is pressed against a rotating roll-shaped embossing mold (embossing roll), and irradiated with ultraviolet light. As a result, an embossed pattern is transferred to the ultraviolet curable resin, and servo-imprinted layer 102 having a tracking pattern is disposed over base film 101.

The embossing roll is a roll-shaped embossing mold provided by connecting four tracking patterns in which various signals are embedded. Therefore, four types of tracking patterns are repeatedly transferred to servo-imprinted layer 102.

Figure 2:
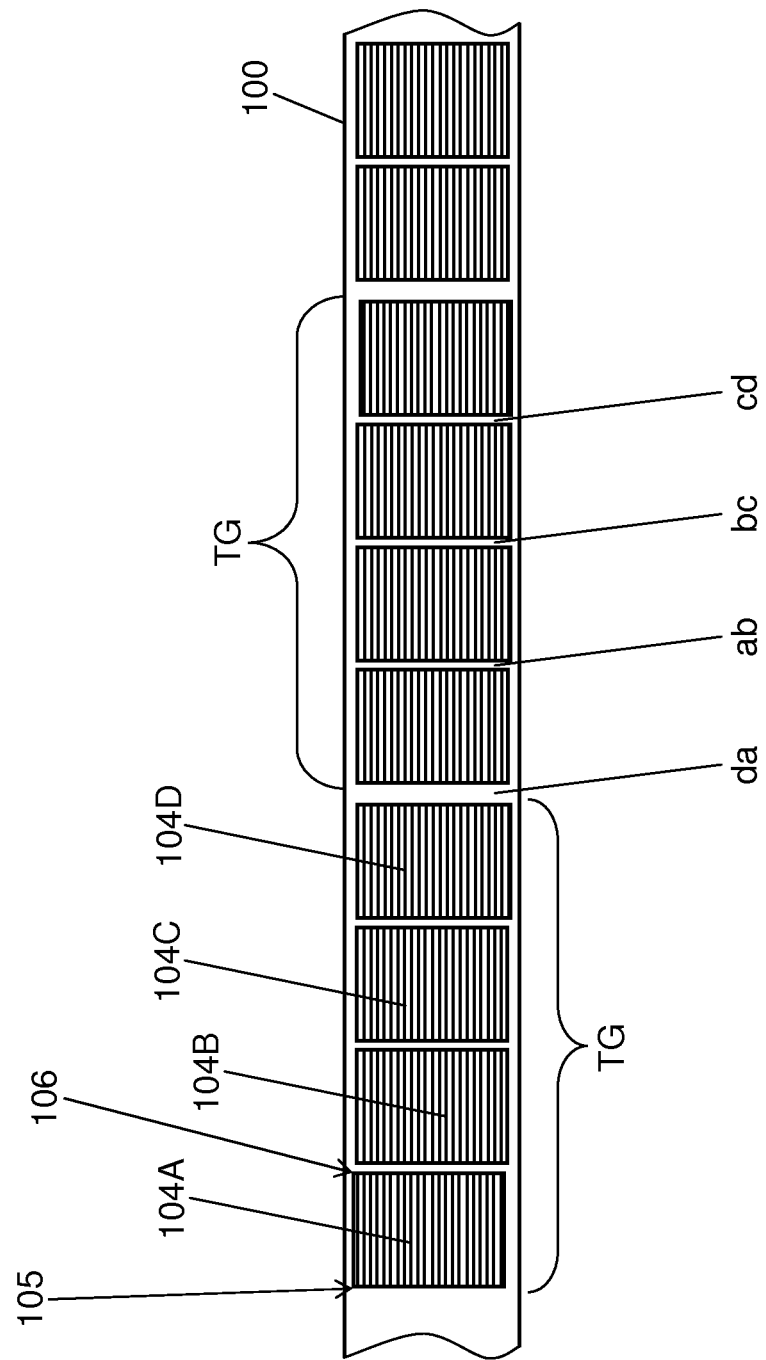
FIG. 2 is a plan view illustrating an arrangement of tracking patterns over the tape recording medium according to one exemplary embodiment.

FIG. 2 is a plan view illustrating how recording layer 103 is disposed. Recording layer 103 is provided by having an alloy film, a dielectric film, and a reflective film be stacked over the tracking patterns using a sputtering method. The alloy film mainly includes Ge, Bi, and Te. The dielectric film mainly includes Si. The reflective film mainly includes Ag. In this exemplary embodiment, thickness of recording layer 103 is about 100 nm. Servo-imprinted layer 102 provided by the embossing roll having four tracking patterns is disposed between recording layer 103 and base film 101. Therefore, as illustrated in FIG. 2, tape recording medium 100 is provided repeatedly with tracking pattern groups TG (one example of tracking pattern groups) along a traveling direction of the tape, and each of the groups includes four tracking patterns 104A to 104D (one example of tracking patterns). Each of tracking pattern groups TG corresponds to a single rotation around the embossing roll.

Intervals between the tracking patterns (non-tracking pattern areas) in one tracking pattern group TG are different from each other. In other words, interval ab between tracking pattern 104A and tracking pattern 104B, interval bc between tracking pattern 104B and tracking pattern 104C, and interval cd between tracking pattern 104C and tracking pattern 104D are all configured to be different from each other. Further, intervals da between tracking pattern groups TG (an interval between tracking pattern 104D in one group and tracking pattern 104A in the next group) is also configured to be different from any of intervals ab, bc, and cd between the tracking patterns in one tracking pattern group TG.

With such a configuration, it is possible for information recording/reproducing device 200 that will be later described to learn a tracking pattern used for recording or reproduction of tape recording medium 100.

Further, in tracking pattern 104A, it is possible to record a starting signal at starting position 105 and an ending signal at ending position 106, the positions being defined with respect to the tape traveling direction. With this, it is possible to correctly determine whether or not recording or reproduction of tracking pattern 104A is performed. Similarly to tracking pattern 104A, it is possible to record a starting signal at a starting position and an ending signal at an ending position in each of tracking patterns 104B to 104D.

While polyethylene terephthalate is taken as an example in this exemplary embodiment, film carriers such as polyethylene naphthalate and polyamide may also be used. The method of providing the embossing roll may be an electron-beam printing method or any other method. Further, the tracking layer is not limited to the composition using an ultraviolet curable resin. The compositions of the films constituting the optical phase-change layer is not limited to the compositions described above, and may be of either recordable or rewritable type. The method of film formation may be a vacuum evaporation method, an ion plating method, or the like, while the sputtering method is used in the description.

Figure 3:
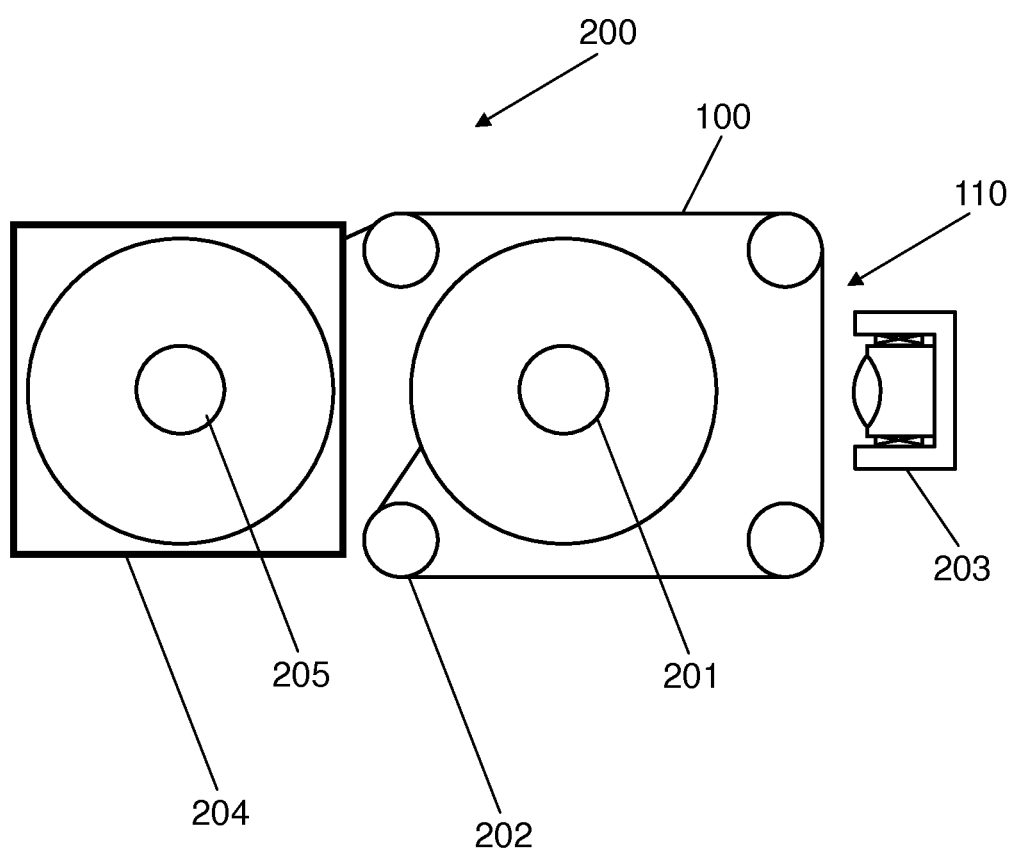
FIG. 3 is a configuration diagram illustrating an information recording/reproducing device according to one exemplary embodiment.

1-2. Information Recording/Reproducing Device 1-2-1. Configuration of Information Recording/Reproducing Device FIG. 3 is a diagram schematically illustrating a configuration of information recording/reproducing device 200 (one example of information recording/reproducing devices) according to this exemplary embodiment. Information recording/reproducing device 200 at least includes take-up reel 201, a plurality of guide rollers 202, optical pickup device 203 (one example of optical recording/reproducing units), and supply reel 205. Optical pickup device 203 is positioned so as to face tape recording medium 100 along tape traveling path 110.

Tape recording medium 100 contained in cartridge 204 is set on supply reel 205 of information recording/reproducing device 200.

Take-up reel 201 is rotated by reel driving mechanism 207 (FIG. 4), and reels in tape recording medium 100 from cartridge 204. Supply reel 205 rotates along with the rotation of take-up reel 201, and reels out tape recording medium 100.

Guide rollers 202 are disposed at predetermined intervals between take-up reel 201 and supply reel 205, and constitute tape traveling path 110 for tape recording medium 100 so that tape recording medium 100 is caused to travel in a desired direction.

Optical pickup device 203 is configured by an optical pickup having a laser light source and a light receiver. Optical pickup device 203 makes traveling tape recording medium 100 be irradiated with laser light from the laser light source, and writes or reads a signal to and from recording layer 103 (FIG. 1).

Figure 4:
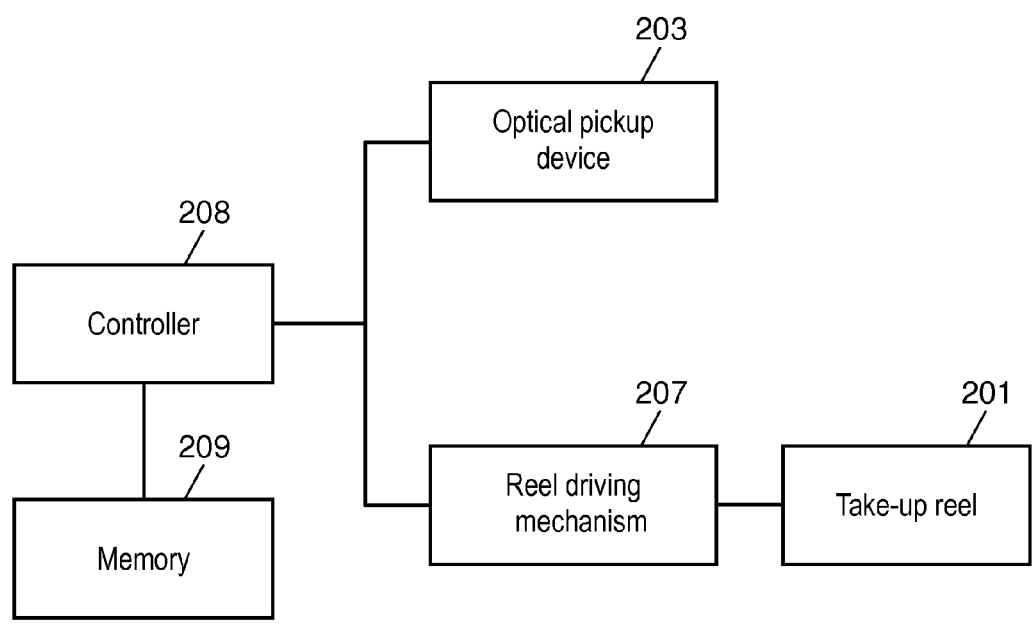
FIG. 4 is a functional diagram illustrating the information recording/reproducing device according to one exemplary embodiment.

As illustrated in FIG. 4, the information recording/reproducing device further includes controller 208 (one example of controllers) and memory 209. Controller 208 is configured by a processor or the like such as a CPU (central processing unit). Controller 208 controls reading and recording of a signal by optical pickup device 203. Controller 208 also drives reel driving mechanism 207 to control rotation of take-up reel 201. Memory 209 stores therein data such as data that has been read and data that is to be recorded.

1-2-2. Operation of Information Recording/Reproducing Device

Take-up reel 201 of information recording/reproducing device 200 reels out tape recording medium 100 from cartridge 204 using a loading mechanism (not depicted). At this time, tape recording medium 100 travels in front of optical pickup device 203 based on rotation control of supply reel 205 and take-up reel 201. Further, based on rotation control of take-up reel 201, tape recording medium 100 passes in front of optical pickup device 203 while being guided by the plurality of guide rollers 202, and then reeled up by take-up reel 201.

In this exemplary embodiment, information recording/reproducing device 200 makes tape recording medium 100 travel at 4.9 m/s when a signal is recorded or reproduced in or from recording layer 103, and makes tape recording medium 100 travel at 20 m/s when a signal is fast-forwarded or fast-rewound.

When a signal is recorded or reproduced, optical pickup device 203 performs tracking along grooves defined in the tracking pattern. At connection between the tracking patterns (non-tracking pattern area), tracking jump in an across-the-width direction is necessary in order to follow the track. At this time, controller 208 may measure time taken until the next pattern is recognized, and record the measured time as a clearance amount and a tracking jump amount between the tracking patterns. With such a configuration, optical pickup device 203 is able to perform tracking immediately when the tracking pattern is lost, once controller 208 records the clearance amount and the tracking jump amount for each connection between the tracking patterns for a single round of the embossing roll. As a result, higher-capacity data may be handled. Further, it is possible to specify the next zone by measuring the clearance amount between the tracking patterns even when fast-forward or fast-rewind is performed.

1-3. Effects

Tape recording medium 100 (one example of tape recording media) according to this exemplary embodiment is optically recordable or reproducible, and includes tracking pattern groups TG (one example of tracking pattern groups) and non-tracking pattern areas ab, bc, and cd (one example of non-tracking pattern areas). Tracking pattern groups TG are repeatedly provided along the longitudinal direction, also known as the machine direction, of the tape, and each of the groups includes the plurality of tracking patterns 104A, 104B, 104C, and 104D. Non-tracking pattern areas ab, bc, and cd are respectively provided between the tracking patterns. Non-tracking pattern areas ab, bc, cd, and da have different lengths along the longitudinal direction of the tape.

Information recording/reproducing device 200 (one example of information recording/reproducing devices) according to this exemplary embodiment records to or reproduces from tape recording medium 100 that is provided repeatedly with tracking pattern groups TG along the longitudinal direction of the tape, and each of the groups includes the plurality of tracking patterns 104A, 104B, 104C, and 104D. Information recording/reproducing device 200 includes optical pickup device 203 (one example of optical recording/reproducing units) that records or reads data in or from tape recording medium 100, and controller 208 (one example of controllers) that controls optical pickup device 203. Optical pickup device 203 reads the intervals between the tracking patterns along the longitudinal direction of the tape.

Thus, it is possible to specify a position of each of the plurality of tracking patterns that are provided repeatedly, even in a case of a tape recording medium that is manufactured by transfer performed using a roll-shaped mold provided by connecting a plurality of patterns having the same tracking patterns.

Further, information recording/reproducing device 200 according to this exemplary embodiment also includes a memory. Controller 208 may measure time taken until the next pattern is recognized, and record in memory 209 the measured time as the clearance amount and the tracking jump amount between the tracking patterns. Therefore, it is possible to immediately perform tracking.

Other Exemplary Embodiment

As described above, one exemplary embodiment has been described as an example of the technique disclosed in the present disclosure. However, the technique disclosed in the present disclosure is not limited to the above exemplary embodiment, and may be applied to an exemplary embodiment with appropriate alteration, substitution, addition, omission, or the like.

While single optical pickup device 203 is provided in the above exemplary embodiment, more than one optical pickup device may be provided.

Further, the traveling speed of the tape when a signal is recorded, reproduced, fast-forwarded, or fast-rewound is not limited to the example shown in the above exemplary embodiment.

Moreover, while the case in which four tracking patterns 104A, 104B, 104C, and 104D are repeatedly transferred has been described, the number of tracking patterns is not limited as long as a plurality of tracking patterns are repeatedly transferred.

Controller 208 is not limited to the configuration as a single processor, and may be configured by a plurality of processors. Further, the processor may be provided within optical pickup device 203.

An application of the present disclosure is not limited to the tape recording medium or the information recording/reproducing device. For example, the present disclosure may also be applied to a method of manufacturing a tape recording medium.

What is claimed is:

1. An optically recordable or reproducible tape recording medium comprising:
   a set of tracking pattern groups, the set of tracking pattern groups repeatedly provided along a longitudinal direction of the tape recording medium, each of the set of tracking pattern groups including a plurality of tracking pattern blocks arranged in the longitudinal direction, each of the tracking pattern blocks including groove patterns extending in the longitudinal direction and arranged in a width direction perpendicular to the longitudinal direction; and
   non-tracking pattern areas respectively provided between the tracking pattern blocks and extending over an entire width of the tape recording medium, no groove pattern being included in the non-tracking pattern areas,
   wherein two of the non-tracking pattern areas, which are adjacent to one pattern block, are configured such that one of the two of the non-tracking pattern areas is substantially longer than another of the two of the non-tracking pattern areas along the longitudinal direction of the tape recording medium.

2. An information recording/reproducing device for recording or reproducing a tape recording medium having a set of tracking pattern groups, the set of tracking pattern groups repeatedly provided along a longitudinal direction of the tape recording medium, each of the set of tracking pattern groups including a plurality of tracking pattern blocks arranged in the longitudinal direction, each of the tracking pattern blocks including groove patterns extending in the longitudinal direction and arranged in a width direction perpendicular to the longitudinal direction, the device comprising:
   an optical recording/reproducing unit configured to record or read data in or from the tape recording medium; and
   a controller configured to control the optical recording/reproducing unit, wherein:
   the tape recording medium includes non-tracking pattern areas respectively provided between the tracking pattern blocks and extending over an entire width of the tape recording medium, no groove pattern being included in the non-tracking pattern areas, and
   the optical recording/reproducing unit reads a length, along the longitudinal direction of the tape recording medium, of the non-tracking pattern areas and performs tracking based on the read length.

3. The information recording/reproducing device according to claim 2, further comprising:
   a memory,
   wherein the controller records lengths of the non-tracking pattern areas, and
   the optical recording/reproducing unit performs the tracking by using the lengths recorded in the memory.

4. A method of manufacturing an optically recordable or reproducible tape recording medium, the method comprising the steps of:
   providing a set of tracking pattern groups repeatedly along a longitudinal direction of the tape recording medium, each of the set of tracking pattern groups including a plurality of tracking pattern blocks arranged in the longitudinal direction, each of the tracking pattern blocks including groove patterns extending in the longitudinal direction and arranged in a width direction perpendicular to the longitudinal direction;
   providing non-tracking pattern areas respectively between the tracking pattern blocks, the non-tracking pattern areas extending over an entire width of the tape recording medium, no groove pattern being included in the non-tracking pattern areas; and
   providing two of the non-tracking pattern areas, which are adjacent to one pattern block, so as to be configured such that one of the two of the non-tracking patterns areas is substantially longer than another of the two of the non-tracking pattern areas along the longitudinal direction of the tape recording medium.

5. The optically recordable or reproducible tape recording medium of claim 1, wherein each of the tracking pattern blocks includes a start position indicator and an end position indicator.

* * * * *